United States Patent
Akaike

(10) Patent No.: US 7,225,071 B2
(45) Date of Patent: May 29, 2007

(54) VEHICLE TRANSMISSION CONTROL SYSTEM

(75) Inventor: Tsutomu Akaike, Fuji (JP)

(73) Assignee: JATCO Ltd., Fuji-shi (JP)

( * ) Notice: Subject to any disclaimer, the term of this patent is extended or adjusted under 35 U.S.C. 154(b) by 129 days.

(21) Appl. No.: 11/085,011

(22) Filed: Mar. 21, 2005

(65) Prior Publication Data

US 2005/0222734 A1    Oct. 6, 2005

(30) Foreign Application Priority Data

Mar. 30, 2004  (JP)  ............................. 2004-100960

(51) Int. Cl.
*G06F 7/00*    (2006.01)
(52) U.S. Cl. ............................. 701/51; 701/52; 701/90; 477/34; 477/45
(58) Field of Classification Search ............... 701/51, 701/52, 67, 90, 95, 103; 477/34, 45, 62
See application file for complete search history.

(56) References Cited

U.S. PATENT DOCUMENTS 5,562,571 A * 10/1996 Maruyama et al. ......... 477/174
6,077,190 A * 6/2000 Tabata et al. ................. 477/97
6,216,081 B1 * 4/2001 Tabata et al. ................. 701/87

FOREIGN PATENT DOCUMENTS

JP    2003-74683 A    3/2003

OTHER PUBLICATIONS

U.S. Appl. No. 11/085,013, filed Mar. 21, 2005, Akaike.

* cited by examiner

*Primary Examiner*—Gertrude A. Jeanglaude
(74) *Attorney, Agent, or Firm*—Foley & Lardner LLP

(57) ABSTRACT

Clutch pressure is reduced when a vehicle is stopped with an engine (1) in an idling state. Once a turbine rotation speed increases to a predetermined rotation speed, the clutch pressure is increased to an initial pressure. After the initial pressure is reached, the clutch pressure is controlled to a target hydraulic pressure at which a slip amount reaches a target slip amount. Once the clutch pressure converges, a correction value for an initial pressure is set in order to make the slip amount approach the target slip amount. The set correction value is stored in a memory region corresponding to a transmission oil temperature at the point when the correction value is set. The initial pressure is corrected by the correction value stored in the memory region that corresponds to the transmission oil temperature when the turbine rotation speed has increased to the predetermined rotation speed.

4 Claims, 5 Drawing Sheets

| OIL TEMPERATURE | RAM |
|---|---|
| MAX~60°C | REGION A |
| 60°C~0°C | REGION B |
| 0°C~MIN | REGION C |

FIG. 3

VEHICLE TRANSMISSION CONTROL SYSTEM

FIELD OF THE INVENTION

This invention relates to a transmission control system used in a vehicle.

BACKGROUND OF THE INVENTION

JP2003-74683A, published by the Japan Patent Office in 2003, discloses neutral control that reduces hydraulic pressure supplied to an automatic transmission clutch to maintain the clutch in a state immediately prior to engagement when a vehicle is stopped in an engine idling state. Feedback control may be used to perform neutral control. In feedback control, a slip amount of a torque converter (which equals the engine rotation speed minus the turbine rotation speed) is controlled to reach a target slip amount.

SUMMARY OF THE INVENTION

There is a chance that the actual slip amount will deviate from the target slip amount, however, even when feedback control converges. One method considered for eliminating this deviation (steady state error) is to set a correction value in accordance with the deviation present when a brake pedal is released and neutral control is stopped, and then to associate the set correction value with the oil temperature of the automatic transmission at that point. The association is then stored in memory. When next starting slip amount control, the correction value associated with the oil temperature of the automatic transmission at that point may be read out from the memory in order to correct the clutch pressure at the start of slip amount control.

The correction value will not be stored in the correct region of the memory, however, when the oil temperature at the point when neutral control is canceled differs from the oil temperature when slip amount control is started. The oil temperature at the point when neutral control is canceled is normally higher than the oil temperature when slip amount control is started. As the correction amount is used when starting slip amount control, it is necessary to associate the correction value with an operation state at the point when slip control is started, and then store this association in the memory. Suitable correction values cannot be obtained if the correction values are not stored in appropriate regions of the memory, and it becomes difficult to control the slip amount so that it reaches the target slip amount.

It is therefore an object of this invention to store correction values in appropriate regions of a memory, and to control a slip amount to a target value slip amount in neutral control.

In order to achieve above object, this invention provides a transmission control system comprising: an automatic transmission connected to an engine, the automatic transmission comprising a torque converter and a power transmission clutch that is engaged when supplied with hydraulic pressure upon start of a vehicle; a hydraulic pressure circuit that supplies hydraulic pressure to the power transmission clutch; and a controller connected to the hydraulic circuit to control the hydraulic circuit.

The controller has a plurality of memory regions partitioned according to an operation state of the automatic transmission; reduces the hydraulic pressure supplied from the hydraulic pressure circuit to the power transmission clutch when the vehicle is stopped with the engine in an idling state; increases the hydraulic pressure supplied to the power transmission clutch to an initial pressure once the turbine rotation speed has increased to a predetermined rotation speed; controls the hydraulic pressure supplied to the power transmission clutch to approach a target hydraulic pressure once the hydraulic pressure supplied to the power transmission clutch has increased to the initial pressure, the target hydraulic pressure being a hydraulic pressure at which a slip amount, which is equal to the difference between a turbine rotation speed and an engine rotation speed, becomes a target slip amount; sets a correction value of the initial pressure for causing the slip amount to approach the target slip amount once the hydraulic pressure supplied to the power transmission clutch has converged; and stores the set correction value in a memory region corresponding to an operation state of the automatic transmission at the point when the correction value is set.

The initial hydraulic pressure is corrected according to a correction amount stored in a memory region corresponding to the operation state of the automatic transmission at the point when the turbine rotation speed increases to the predetermined rotation speed.

The details as well as other features and advantages of this invention are set forth in the remainder of the specification and are shown in the accompanying drawings.

BRIEF DESCRIPTION OF THE DRAWINGS

FIG. 3 is a conceptual diagram of regions in which correction values for initial values are stored.

DETAILED DESCRIPTION OF THE PREFERRED EMBODIMENTS

Figure 1:
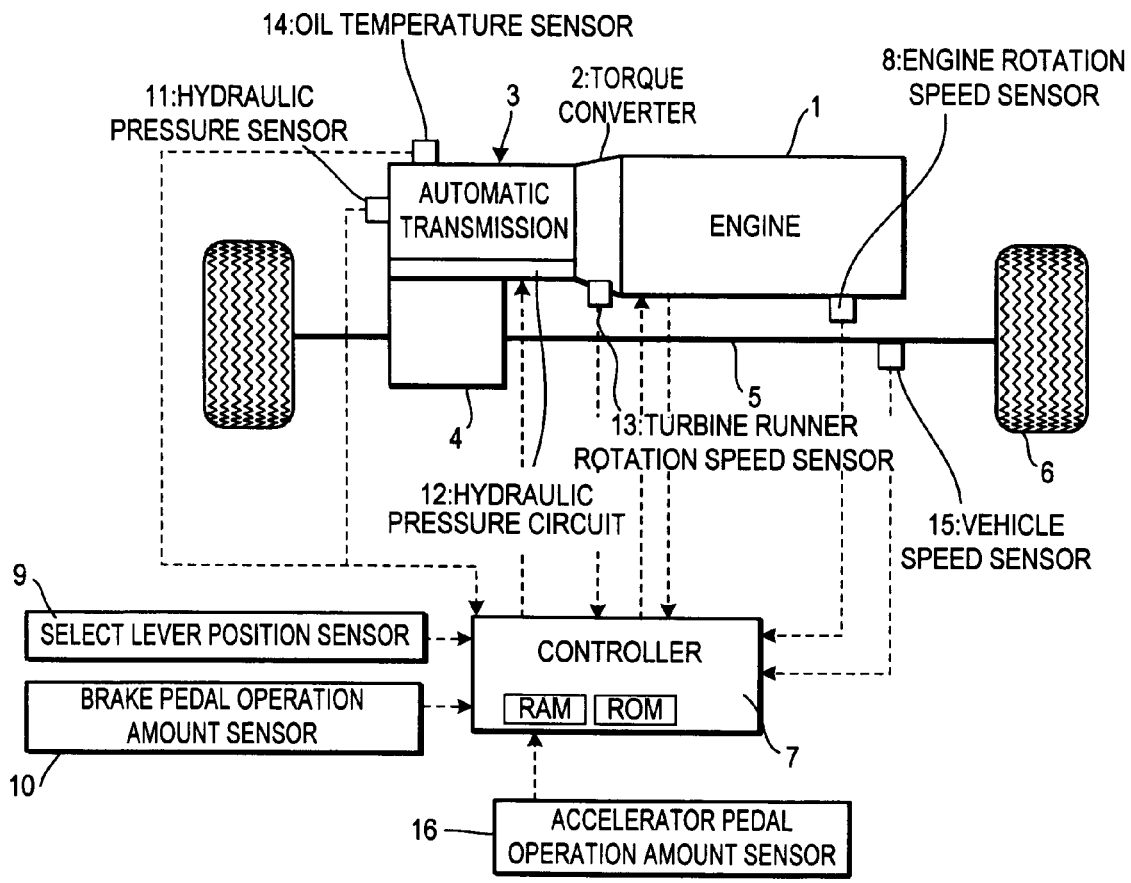
FIG. 1 is a schematic block diagram of a transmission control system according to this invention.

FIG. 1 is a block diagram of a transmission control system according to this invention. Rotation of an engine 1 is transmitted to an automatic transmission 3. The rotation is transmitted to drive wheels 6, through a differential gear unit 4, and a drive shaft 5, after undergoing a speed change by the automatic transmission 3. The automatic transmission 3 comprises a torque converter 2, and a hydraulic pressure circuit 12 that regulates the hydraulic pressure supplied to constituent elements of the automatic transmission 3.

Figure 2:
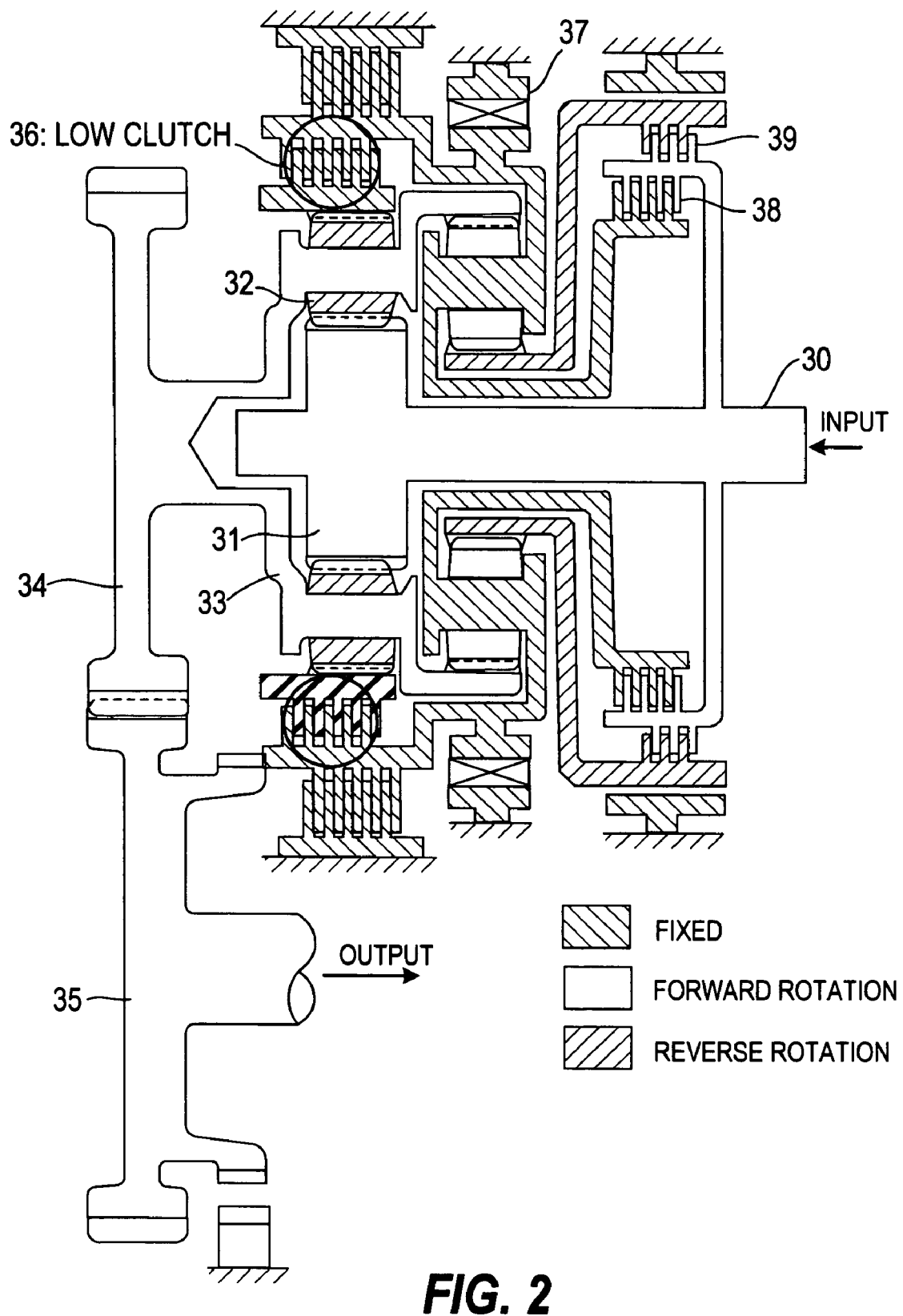
FIG. 2 is a block diagram of an automatic transmission.

FIG. 2 is a block diagram of portions other than the torque converter 2 of the automatic transmission 3. FIG. 2 shows a state of the automatic transmission 3 when a running range such as a drive (D) range, a second gear (2) range, or a low (L) range is selected. Power input to an input shaft 30 is transmitted to a planetary gear 32 through a sun gear 31 of a planetary gear mechanism provided in an end portion of the input shaft 30. The power transmitted to the planetary gear 32 is then transmitted from a carrier 33 to an output gear 34, and output from an idler gear 35 that meshes with the output gear 34. When a vehicle starts to move forward from a stopped state, a low clutch 36 is engaged, a one-way clutch 37 operates, and a high clutch 38 and a reverse clutch 39 are released.

A controller 7 that comprises one or a plurality of microprocessors, an input-output interface, read only memory (ROM), and random access memory (RAM) controls the transmission control system. As shown in FIG. 3, a plurality of memory regions A to C, into which the RAM is divided according to the oil temperature of the automatic transmission 3, are secured in the RAM.

Outputs from a sensor 8 that detects the rotation speed of the engine 1, a sensor 9 that detects the position of a select lever, a sensor 10 that detects the operation amount of a brake pedal, a sensor 11 that detects a hydraulic pressure Pc supplied to the low clutch 36 within the automatic transmission 3, a sensor 13 that detects a rotation speed N of the turbine runner of the torque converter 2 (hereinafter called turbine rotation speed), a sensor 14 that detects an oil temperature To of the automatic transmission 3, a sensor 15 that detects the speed of the vehicle, and a sensor 16 that detects the operation amount of the accelerator pedal are all input to the controller 7.

When the vehicle is stopped with the engine 1 in an idling state, the controller 7 performs neutral control to maintain the clutch 36 in a state immediately prior to engagement by decreasing the hydraulic pressure supplied from the hydraulic pressure circuit 12 to the low clutch 36.

Neutral control is started when conditions (i) to (v) described below are all met, for example.

(i) The vehicle is in a stopped state (=vehicle speed is zero).
(ii) The engine 1 is at a speed equal to or greater than a predetermined speed.
(iii) The select lever is in the driving range.
(iv) The accelerator pedal is released.
(v) The brake pedal has been depressed for a period of time equal to or greater than a predetermined period of time.

The conditions for starting neutral control are deemed not to be met when any one of the conditions (i) to (v) is not met. It should be noted that the conditions for starting neutral control are not limited to the conditions described above. More conditions than those listed above, and conversely fewer conditions than those listed above, may also be used.

First, when the conditions for starting neutral control are met, the controller 7 instantaneously reduces the clutch pressure Pc supplied to the low clutch 36 to a predetermined pressure p1, and then reduces the clutch pressure Pc at a constant rate of change. A turbine rotation speed N increases as the clutch pressure Pc is reduced. An amount of time T1 from after the clutch pressure Pc is reduced until the turbine rotation speed N reaches a target rotation speed N1 is measured, and the amount of time T1 is compared to a target amount of time Tt. The predetermined pressure p1 is then corrected so that the amount of time T1 will approach the target amount of time Tt when neutral control is next performed.

When the turbine rotation speed N reaches the target rotation speed N1, the controller 7 instantaneously increases the clutch pressure Pc to an initial pressure Pi that is set in advance. The controller 7 then slowly increases the turbine rotation speed N, thus reducing a slip amount S, which is the difference between the turbine rotation speed N and an engine rotation speed Ne.

At this point the clutch pressure Pc is controlled so that the slip amount S becomes a target slip amount St. Specifically, feedback control is performed on the clutch pressure Pc so that the clutch pressure Pc approaches the target clutch pressure Pt that will achieve the target slip amount St. As a result, the clutch pressure Pc converges to a constant value while increasing and decreasing.

However, there is a chance that the converged value of the clutch pressure Pc will deviate from the target clutch pressure Pt, even when feedback control is performed. In order to eliminate this deviation (steady state error), it is necessary to correct the hydraulic pressure (the initial hydraulic pressure Pi) according to the deviation when increasing the clutch pressure Pc to start slip amount control. The converged value of the clutch pressure Pc will change, and can be made to approach the target clutch pressure Pt, when the initial hydraulic pressure Pi is corrected according to the deviation.

With the present invention, the clutch pressure Pc is determined to have converged when a variation range $\Delta P$ for the clutch pressure Pc becomes less than a predetermined value $\Delta Pt$. A correction value $\lambda$ is then set according to the difference between the slip amount S and the target slip amount St at that point. The correction value $\lambda$ may also be set according to the deviation between the converged value of the clutch pressure Pc and the target clutch pressure Pt. The variation range $\Delta P$ of the clutch pressure Pc is the difference between the high peak value (maximum value) of the clutch pressure Pc and the subsequent low peak value (minimum value) as the clutch pressure Pc varies. The correction value $\lambda$ is then stored in a memory region of the RAM corresponding to the oil temperature of the automatic transmission 3 at the point when the variation range $\Delta P$ of the clutch pressure Pc becomes less than the predetermined value $\Delta Pt$.

The correction value $\lambda$ is thus associated not with the oil temperature of the automatic transmission 3 at the point when a brake pedal is released and neutral control converges, but instead, is associated with the oil temperature of the automatic transmission 3 at an earlier point. This is done in order to reduce the difference between the temperature at the point when the initial pressure Pi is corrected, and the temperature at the point when the correction value $\lambda$ is set, and then store the correction value $\lambda$ in an appropriate memory region.

Figure 4:
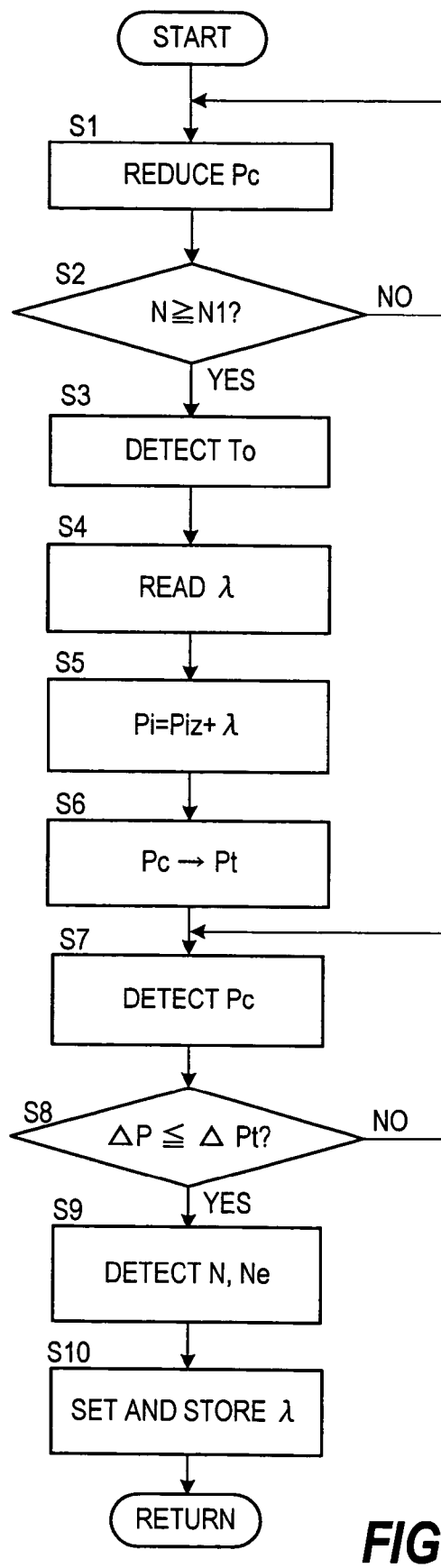
FIG. 4 is a flowchart of neutral control.

A flowchart in FIG. 4 shows the contents of neutral control performed by the controller 7.

First, in a step S1, the controller 7 instantaneously reduces the clutch pressure Pc to the predetermined pressure p1, and then reduces the clutch pressure Pc at a constant rate of change.

In a step S2, a determination is made as to whether the turbine rotation speed N has reached the target rotation speed N1. Processing proceeds to a step S3 when the rotation speed N has reached the target rotation speed N1. Otherwise, processing returns to the step S1 and the clutch pressure Pc is further reduced at the constant rate of change.

In the step S3, an oil temperature To of the automatic transmission 3 is detected.

In a step S4, the correction value $\lambda$, which is stored in the memory region of the RAM corresponding to the temperature To detected in the step S3, is read out.

In a step S5, the correction value $\lambda$ read out is added to the previous value (a value Piz) of the initial pressure Pi, and the result is taken as a new initial pressure Pi. The clutch pressure Pc is then increased instantaneously to the initial pressure Pi.

In a step S6, feedback control is performed to increase the clutch pressure Pc from the initial pressure Pi to approach the target clutch pressure Pt that corresponds to the target slip amount St. As a result, the clutch pressure Pc converges to a fixed pressure while increasing and decreasing.

In a step S7, the clutch pressure Pc is detected.

In a step S8, the variation range $\Delta P$ of the detected clutch pressure Pc is found, and a determination is made as to whether the variation range $\Delta P$ is equal to or less than the predetermined value $\Delta Pt$. The variation range $\Delta P$ is the difference between the high peak value (maximum value) of the clutch pressure Pc and the low peak value (minimum value) that follows as the clutch pressure Pc varies, and indicates the amplitude of the varying clutch pressure Pc. Processing proceeds to a step S9 when the variation range ΔP is equal to or less than the predetermined value ΔPt. Processing otherwise returns to the step S7.

In the step S9, the turbine rotation speed N and the engine rotation speed Ne at the point when the variation range ΔP has been determined to be equal to or less than the predetermined value ΔPt are detected.

In a step S10, the slip amount S, which is equal to the difference between the turbine rotation speed N and the engine rotation speed Ne detected in the step S9, is found. The correction value λ is then set according to the difference between the slip amount S and the target slip amount St.

For example, the correction value λ is set to a more positive value as the slip amount S becomes larger than the target slip value St, and is set to a more negative value as the slip amount S becomes smaller than the target slip value St. The larger the slip amount S is compared to the target slip amount St, the larger the initial pressure Pi thus becomes at the point when slip control is next performed. The slip amount S can thus be made to decrease and approach the target slip amount St. Conversely, the smaller the slip amount S is compared to the target slip amount St, the smaller the initial pressure Pi thus becomes at the point when slip control is next performed. The slip amount S can thus be made to increase and approach the target slip amount St.

It should be noted that, although the correction value λ is set according to the deviation between the slip amount S and the target slip amount St, the correction value λ may also be set according to the deviation between the converged value of the clutch pressure Pc and the target clutch pressure Pt.

Once the correction value λ is set, the oil temperature To of the automatic transmission 3 at that point is detected, and the correction value λ is stored in the memory region of the RAM corresponding to the detected oil temperature To.

It should also be noted that, although the correction value λ is set when the variation range ΔP of the clutch pressure Pc is determined to be equal to or less than the predetermined value ΔPt, the correction value λ may also be set after a predetermined amount of time has elapsed once the variation range ΔP of the clutch pressure Pc is determined to be equal to or less than the predetermined value ΔPt.

Figure 5:
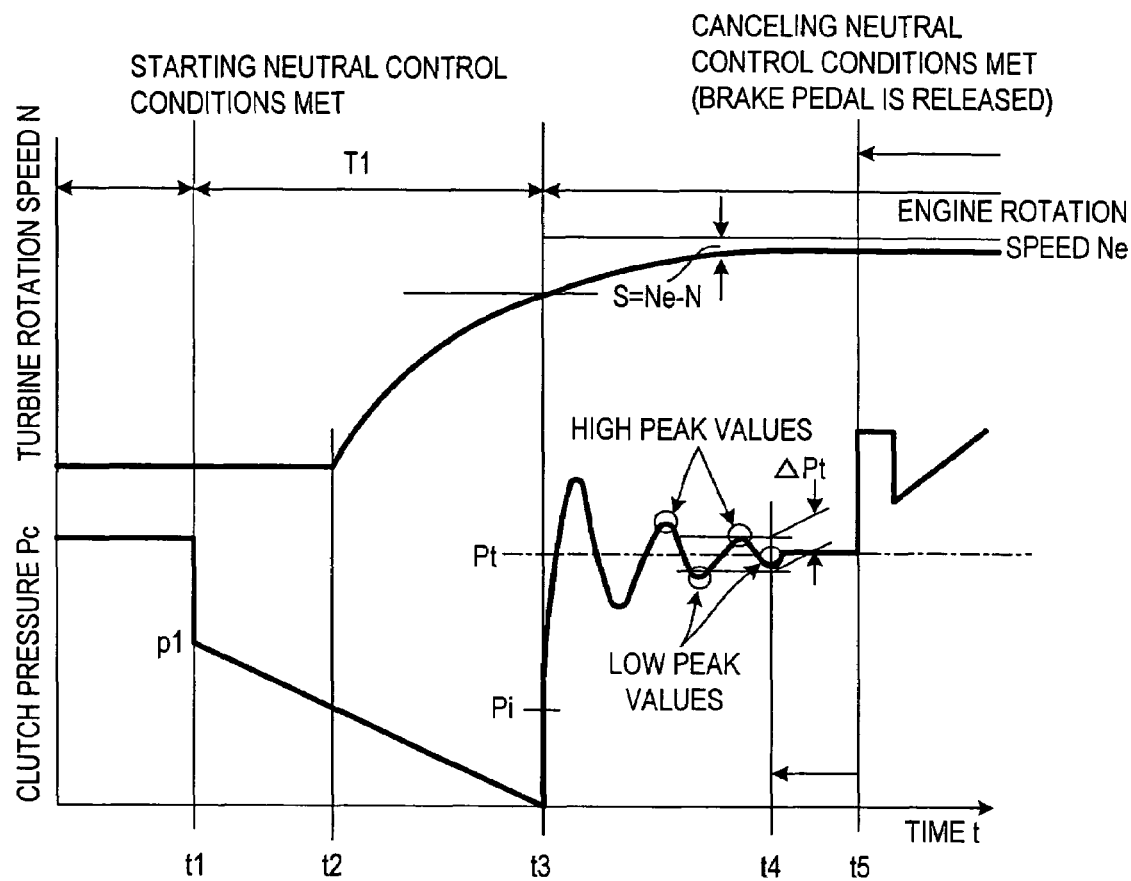
FIG. 5 is a timing chart that shows a state when neutral control is performed.

FIG. 5 shows a state when neutral control is performed.

When the conditions for starting neutral control are met at a time t1, the clutch pressure Pc is instantaneously reduced to the predetermined pressure p1, and the clutch pressure Pc is then further reduced at a constant rate of change.

When the clutch pressure Pc has decreased to a certain value at a time t2, the turbine rotation speed N begins to increase.

When the turbine rotation speed N has reached the target rotation speed N1 at a time t3, the clutch pressure Pc is instantaneously increased to the initial pressure Pi, and feedback control (slip amount control) is performed so that the slip amount S reaches the target slip amount St. The initial pressure Pi is a value computed by adding the correction value λ, which is stored in the memory region of the RAM corresponding to the oil temperature To of the automatic transmission 3 when the turbine rotation speed N reaches the target rotation speed N1 and control of the slip amount is started, to the previous value of the initial pressure Pi.

The clutch pressure Pc converges to a value while varying up and down. When the varying range ΔP of the clutch pressure Pc becomes equal to or less than the predetermined value ΔPt at a time t4, the correction value λ for the initial pressure Pi is set in order to make the slip amount S approach the target slip amount St.

The set correction value λ is stored in the memory region of the RAM corresponding to the oil temperature To of the automatic transmission at the point when the correction value λ is set. The correction value λ is used in correcting the initial pressure Pi when slip amount control is next started.

When the brake pedal is released at a time t5, and the conditions for canceling neutral control are met, control for starting the vehicle begins.

According to the present invention, the correction value λ of the initial pressure Pi is not associated with the oil temperature To of the automatic transmission 3 at the point when the brake pedal is released and neutral control is canceled. Instead, the correction value λ is associated with the oil temperature To of the automatic transmission 3 at an earlier point, and then stored in the appropriate memory region of the RAM. The difference between the temperature at the point when the initial pressure Pi is corrected, and the temperature at the point when the correction value λ is set and stored, can thus be made smaller. The correction value λ can be stored in the correct memory region, and an appropriate correction value for starting to perform slip amount control can be obtained. The initial value of the clutch pressure can thus be suitably corrected, and the slip amount can be controlled to the target slip amount.

What is claimed is:

1. A transmission control system comprising:
an automatic transmission connected to an engine, the automatic transmission comprising a torque converter and a power transmission clutch that is engaged to transmit an output rotation from the torque converter when supplied with hydraulic pressure upon start of a vehicle;
a hydraulic pressure circuit that supplies hydraulic pressure to the power transmission clutch; and
a controller connected to the hydraulic circuit to control the hydraulic circuit, wherein the controller:
has a plurality of memory regions partitioned according to an operation state of the automatic transmission;
reduces the hydraulic pressure supplied from the hydraulic pressure circuit to the power transmission clutch when the vehicle is stopped with the engine in an idling state;
increases the hydraulic pressure supplied to the power transmission clutch to an initial pressure once a turbine rotation speed has increased to a predetermined rotation speed;
controls the hydraulic pressure supplied to the power transmission clutch to approach a target hydraulic pressure once the hydraulic pressure supplied to the power transmission clutch has increased to the initial pressure, the target hydraulic pressure being a hydraulic pressure at which a slip amount, which is equal to a difference between the turbine rotation speed and an engine rotation speed, becomes a target slip amount;
sets a correction value of the initial pressure for causing the slip amount to approach a target slip amount once the hydraulic pressure supplied to the power transmission clutch has converged;
stores the set correction value in a memory region corresponding to an operation state of the automatic transmission at a point when the correction value is set, and corrects the initial hydraulic pressure according to a correction amount stored in a memory region corresponding to the operation state of the automatic transmission at a point when the turbine rotation speed increases to the predetermined rotation speed.

2. The transmission control system as defined in claim 1, wherein the operation state of the automatic transmission comprises an oil temperature of the automatic transmission.

3. The transmission control system as defined in claim 1, wherein the controller sets the correction value so as to increase the initial pressure when the slip amount at the point when the hydraulic pressure supplied to the power transmission clutch converges is greater than the target slip amount.

4. The transmission control system as defined in claim 1, wherein the controller sets the correction value so as to decrease the initial pressure when the slip amount at the point when the hydraulic pressure supplied to the power transmission clutch converges is less than the target slip amount.

* * * * *